3,585,695
ADJUSTABLE PIPE END MOLD
Robert D. Penny, Crane, and Dick Yates, Midland, Tex., assignors to Gulf Oil Corporation, Pittsburgh, Pa.
Filed Feb. 25, 1969, Ser. No. 802,173
Int. Cl. B28b 21/80
U.S. Cl. 25—38            6 Claims

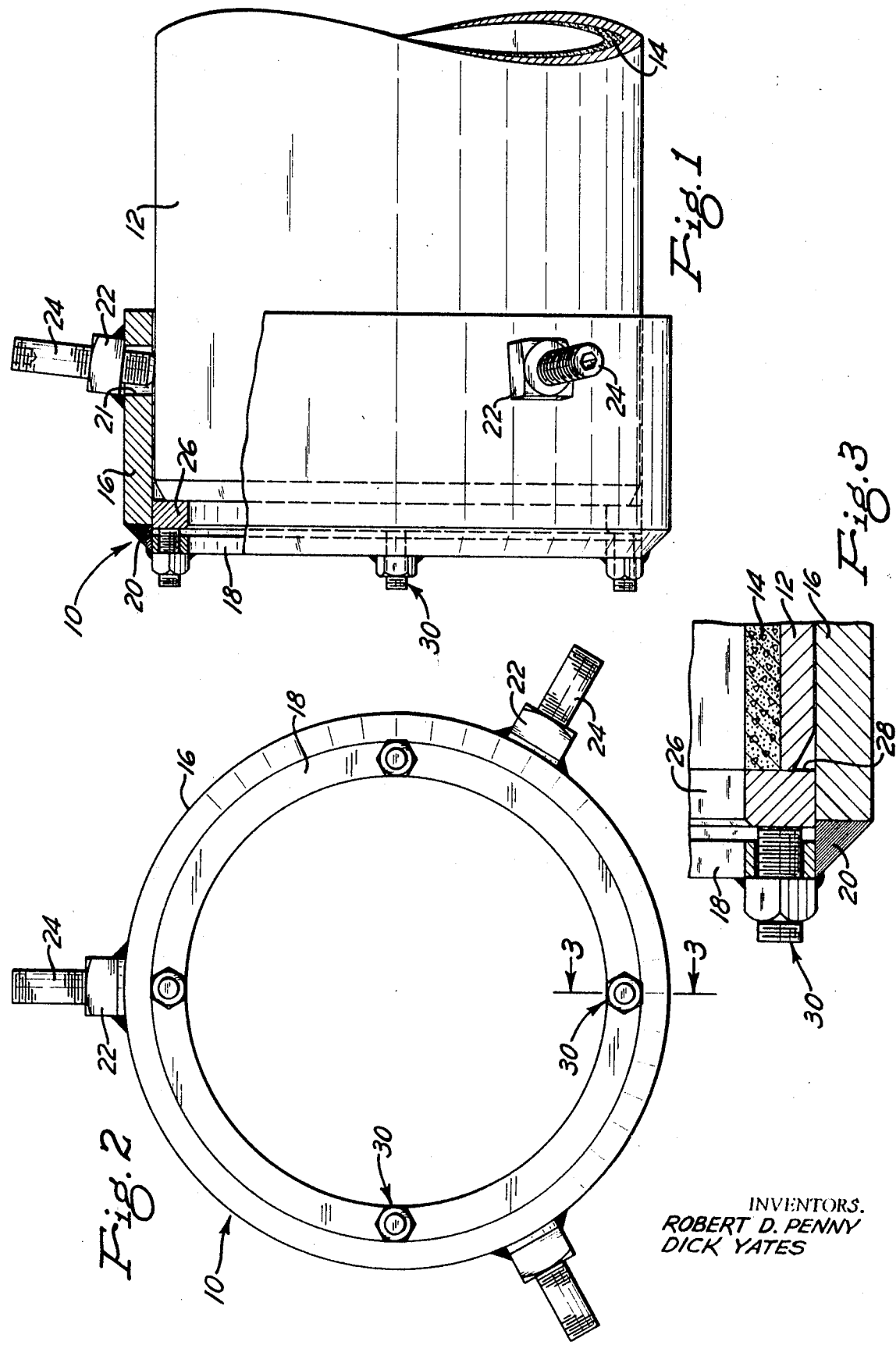

ABSTRACT OF THE DISCLOSURE

A device for molding the end of a cast cement pipe lining comprising a sleeve that fits snugly over the pipe end and which carries bolts to urge the pipe into round within the sleeve. A keeper ring within the sleeve bears against the pipe end face to accommodate flatness irregularities in the end face and to define the lining thickness. Bolts mounted in an end ring on the sleeve urge the keeper ring tightly against the pipe end face.

---

This invention relates to the field of reconditioning of oil field tubular goods, and more particularly it pertains to a tool for use in cement lining the inside of pipe.

As used herein, "cement," "cement lining," and the like shall be understood to mean any material for lining a pipe, which can be cast, usually a mixture of a portland cement binder and sand or pozzolan.

In field petroleum production it is often desirable to line the inside of various different pipes with such cement. Basically, the purpose of the lining is to protect the metal of the pipe against corrosion and thereby prolong it life. This problem arises in many different situations, and is particularly pertinent where acid, brine, or other corrosive fluids are to be carried by the pipe, as for example in water flooding a field.

The cement lining is almost universally applied by centrifugal force, that is, the pipe is put on a lathe-like machine, a predetermined quantity of cement is laid in the pipe, and the pipe spun at relatively high speed to thereby throw or cast the cement outwardly and apply it to the inside of the pipe with uniform thickness all around. A problem that arises in cement lining a pipe is, that the ends of the pipe, which may be threaded on either side, or not threaded at all, are often damaged and/or out of round prior to the lining or re-lining operation. These irregularities in the ends of the pipes heretofore necessitated hand finishing of the ends of the cement lining, which hand operation is relatively expensive and inefficient. Another disadvantage of hand made ends is that the cement in the end is not subjected to the relatively large amount of centrifugal force as is the remaining cement in the lining, thus resulting in a non-homogeneous cement end. Thus, the hand made ends were not acceptable since they were highly susceptible to breakage during handling and assembling of a line of pipe.

The present invention provides a tool to be applied to the end of the pipe during the cement lining operation which will correct its out of roundness condition, while simultaneously providing a stop for the cement to assure that the thickness of the cement lining will be uniform both all around and from end to end.

Another advantage of the apparatus of the invention is that it does not depend upon threads on other attachment means on the outside of the pipe. Some prior apparatuses connect to the pipe by means of such threads and cannot function without them. In today's oil field usage, many of the pipes intended for use in carrying corrosive fluids, and which are cement lined, are plain-ended and are joined together by welding. Thus, such prior threaded devices cannot be used with the pipes with which the present invention is used. Other prior devices for attachment to plain-ended pipes are of the split ring type, and must be joined to the pipe well away from the end to assure that it will not be thrown off of the pipe during the high speed spinning needed to properly cast the cement. The present invention includes holding means which permit the apparatus to be located directly on the end of plain end pipe or any other kind of pipe. The out of roundness correction will apply to virtually any kind of pipe end treatment.

The above and other advantages of the invention will be pointed out or will become evident in the following detailed description and claims, and in the accompanying drawing also forming part of the disclosure, in which:

FIG. 1 is a side elevational view of an apparatus embodying the invention shown mounted on a pipe with some parts broken away and in cross section; FIG. 2 is an end view thereof; and FIG. 3 is a cross-sectional view taken on line 3—3 of FIG. 2.

Referring now in detail to the drawing, an adjustable pipe end mold embodying the invention is generally designated by reference numeral 10, and is shown mounted on a pipe 12 which has gone through the lining operation and therefore has a lining 14 of cement. Pipe end mold 10 comprises a sleeve 16, having an end ring 18 joined to it at one end thereof as by means of a weld bead 20. The apparatus of the invention could be used to line any size pipe, dependent upon the inside diameter of sleeve 16, and successfully built and used embodiments of the invention have accommodated nominal pipe sizes ranging from 2⅞ inches through 14 inches.

Means are provided to hold device 10 tightly to the pipe, while simultaneously forcing the end of the pipe into round prior to casting the cement lining 14. To this end, sleeve 16 is formed with a plurality of openings 21, three being provided in the embodiment being described, each having a nut 22 welded thereto, which nut carries a tightening bolt 24. While the drawing shows three nut and bolt assemblies 22, 24, it will be understood by those skilled in the art that more than three such assemblies could be provided for larger sizes of pipe. The axes of the bolts 24 are radial with respect to the imaginary axis of the sleeve 16, see FIG. 2, and are also inclined with respect to perpendicular to said imaginary axis, see FIG. 1, with their inner ends directed towards end ring 18. This angle of inclination towards the end of the pipe has been found to be preferably about 6°. When the bolts 24 are vertical, and when the angle is substantially greater than 6°, the end mold 10 tends to slip off the pipe during spinning.

Means are provided to assure a uniform thickness of cement lining at the end of the pipe, and to provide a smooth and clean end face on the cement lining. This smooth, clean end face is desirable because, during present day welding techniques, a gasket is placed between the end faces of the cement lining of two pipes to both protect the cement linings against the heat of the weld, and to provide a proper spacing, for welding purposes, between the abutting metal ends of the pipes. To this end, mold 10 includes a keeper ring 26 which is positioned adjacent end ring 18 within sleeve 16. The inside face 28 of ring 26 is ground and polished, and the end of the cement lining 14 abuts against this face. The radial thickness of ring 26 is so chosen, with respect to the wall thickness of the particular pipe 12 being lined, that excess cement will flow through the inside of the keeper ring, thus assuring a proper and uniform thickness of the cement lining 14 throughout.

Means are provided to compenate for slight variations in the length of the pipe and to compensate for slight irregularities in the flatness of the plane of the end face of the pipe. To this end, a plurality of keeper ring adjusting nut and bolt assemblies 30 are provided with each nut fixed, by welding or other suitable means, to the outside of the end ring 18, and with each bolt passing through a suitably formed opening in the end ring to bear against the keeper ring 26.

In use, the bolts 24 and the bolts of assemblies 30 are withdrawn so that they are located within their respective clearance openings. A proper sized keeper ring is selected and placed inside sleeve 16. The assembly 10 is slipped over the end of a pipe, with the pipe end face slightly spaced from the keeper ring. The relatively sturdy bolts 24 are then turned in their nuts 22 to force the end of the pipe into round, to whatever remaining extent this has not been done by insertion of the pipe within the snugly fitting sleeve 16. After the bolts 24 have been operated and the pipe is in round, the bolts of assembly 30 are operated to urge the keeper ring 26 tightly up against the end face of the pipe. The pipe is then cement lined in the usual manner.

It is to be noted that the angle of inclination of the bolts 24 both urge the end of the pipe into round while providing a highly secure anchor to resist the tendency of the spinning motion to throw the mold 10 off the pipe during casting. A secure anchor is provided because the corner of each bolt 24 tends to slightly dig into the metal of the pipe 12.

Bolts 24 and the bolts of assemblies 30 are shown as being of the socket head type, but other conventional types, such as hexagon head or the like, could as well be used.

While the invention has been described in detail above, it is to be understood that this detailed description is by way of example only, and the protection granted is to be limited only within the spirit of the invention and the scope of the following claims.

We claim:
1. Apparatus for molding the end of a cast lining inside a pipe, said lining extending between the end faces of said pipe over the full length thereof, a sleeve adapted to fit over an end of said pipe, means on said sleeve for urging said pipe end into a round condition and for removeably fixing the sleeve with respect to the pipe end, means enclosed within said sleeve for defining the thickness of the lining within the pipe, and means for urging said thickness defining means against said end face of the pipe with respect to said sleeve.

2. The combination of claim 1, said urging means comprising a plurality of nut and bolt assemblies spaced around said sleeve with the nut of each of said assemblies fixed to the outside of said sleeve, said sleeve being formed with a clearance opening to pass the bolt of each of said nut and bolt assemblies therethrough and into contact with said pipe, and each of said nuts being fixed to said sleeve in such an orientation that the axis of the associated bolt is disposed at a predetermined angle off of an imaginary line defining a diameter of said sleeve, and with the inner end of the bolt directed towards said pipe end.

3. The combination of claim 2, said angle being about six degrees.

4. The combination of claim 1, an end ring joined to said sleeve at one end thereof, and said thickness defining means comprising a keeper ring positioned adjacent said end ring.

5. The combination of claim 4, said keeper ring having a ground and polished finish on that face thereof which is adapted to contact the end face of the pipe and the end face of the lining within the pipe.

6. The combination of claim 4, said keeper ring urging means comprising a plurality of nut and bolt assemblies spaced around said end ring with the nut of each of said assemblies fixed to said end ring, and said end ring being formed with a clearance opening to pass the bolt of each of said nut and bolt assemblies, whereby said bolts may be moved axially with respect to said sleeve to urge said keeper ring against said end face of the pipe.

References Cited
UNITED STATES PATENTS

| | | | |
|---|---|---|---|
| 1,410,751 | 3/1922 | Hanna | 25—30 |
| 2,404,464 | 7/1946 | Sewell | 25—30X |
| 2,670,882 | 3/1954 | Best | 220—55 |
| 2,756,479 | 7/1956 | Garneau | 25—38 |
| 2,863,205 | 12/1958 | Seaman | 25—30X |
| 3,098,764 | 7/1963 | Kao et al. | 25—38 |

J. SPENCER OVERHOLSER, Primary Examiner

B. D. TOBOR, Assistant Examiner

U.S. Cl. X.R.

25—30C, 127R; 138—89; 249—164